United States Patent
Yamashita et al.

(10) Patent No.: US 11,989,473 B1
(45) Date of Patent: May 21, 2024

(54) IMAGE PROCESSING DEVICE, PRINTING SYSTEM, AND NON-TRANSITORY COMPUTER-READABLE STORAGE MEDIUM STORING IMAGE PROCESSING PROGRAM

(71) Applicant: SEIKO EPSON CORPORATION, Tokyo (JP)

(72) Inventors: Mitsuhiro Yamashita, Nagano (JP); Takahiro Kamada, Nagano (JP); Takuya Ono, Nagano (JP); Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/505,153

(22) Filed: Nov. 9, 2023

(30) Foreign Application Priority Data

Nov. 11, 2022 (JP) .................. 2022-180862

(51) Int. Cl.
*G06F 3/12* (2006.01)
*G06T 15/04* (2011.01)

(52) U.S. Cl.
CPC .......... *G06F 3/1256* (2013.01); *G06F 3/1208* (2013.01); *G06T 15/04* (2013.01); *G06T 2200/24* (2013.01)

(58) Field of Classification Search
None
See application file for complete search history.

(56) References Cited

U.S. PATENT DOCUMENTS

| 2005/0206953 | A1 | 9/2005 | Kujirai et al. |
| 2006/0108704 | A1* | 5/2006 | Geiwald ................. B29C 51/10 700/118 |
| 2010/0064211 | A1 | 3/2010 | Kujirai et al. |
| 2011/0261377 | A1 | 10/2011 | Kujirai et al. |
| 2020/0041261 | A1* | 2/2020 | Bernstein ................ F21V 7/005 |

FOREIGN PATENT DOCUMENTS

| JP | 2005-194679 A | 7/2005 |
| JP | 2008-234671 A | 10/2008 |

* cited by examiner

*Primary Examiner* — Darryl V Dottin
(74) *Attorney, Agent, or Firm* — Global IP Counselors, LLP (57) ABSTRACT

An image processing device includes: an image data acquisition unit that acquires image data; a print condition acquisition unit that acquires a print condition including a type of a print medium on which an image is printed; a parameter acquisition unit that acquires a texture parameter indicating a texture of the print medium; a color conversion unit that performs color conversion corresponding to the print condition, on the image data; and a rendering unit that executes rendering, causing the image data on which the color conversion is performed, to correspond to at least one of a front face and a back face of a 3D object representing a shape of the print medium, and causing the texture parameter to correspond to the front face and the back face of the 3D object, and thus generates a rendered image representing the print medium with the image printed thereon.

9 Claims, 7 Drawing Sheets

FRONT FACE        BACK FACE

IMAGE PROCESSING DEVICE, PRINTING SYSTEM, AND NON-TRANSITORY COMPUTER-READABLE STORAGE MEDIUM STORING IMAGE PROCESSING PROGRAM

The present application is based on, and claims priority from JP Application Serial Number 2022-180862, filed Nov. 11, 2022, the disclosure of which is hereby incorporated by reference herein in its entirety.

BACKGROUND

1. Technical Field

The present disclosure relates to an image processing device, a printing system, and a non-transitory computer-readable storage medium storing an image processing program.

2. Related Art

JP-A-2008-234671 discloses a technique of displaying, on a display, a preview image of a print medium with an image printed on the front face and the back face by double-sided printing.

The technique of JP-A-2008-234671 can display, on a display, a preview image of a print medium with an image printed on the front face and the back face. However, the texture of the print medium is not reproduced in the preview image. Therefore, a technique that can reproduce the texture of the front face and the back face of the print medium is desired.

SUMMARY

According to a first aspect of the present disclosure, an image processing device is provided. The image processing device includes: an image data acquisition unit that acquires image data; a print condition acquisition unit that acquires a print condition including a type of a print medium on which an image is printed; a parameter acquisition unit that acquires a texture parameter indicating a texture of the print medium; a color conversion unit that performs color conversion corresponding to the print condition, on the image data; and a rendering unit that executes rendering, causing the image data on which a the color conversion is performed, to correspond to at least one of a front face and a back face of a 3D object representing a shape of the print medium, and causing the texture parameter to correspond to the front face and the back face of the 3D object, and thus generates a rendered image representing the print medium with the image printed thereon.

According to a second aspect of the present disclosure, a printing system is provided. The printing system includes: the image processing device according to the first aspect; a display device that displays the rendered image generated by the image processing device; and a printing device that prints an image on the print medium.

According to a third aspect of the present disclosure, a non-transitory computer-readable storage medium storing an image processing program is provided. The image processing program causes a computer to execute: an image data acquisition function that acquires image data; a print condition acquisition function that acquires a print condition including a type of a print medium on which an image is printed; a parameter acquisition function that acquires a texture parameter indicating a texture of the print medium; a color conversion function that performs color conversion corresponding to the print condition, on the image data; and a rendering function that executes rendering, causing the image data on which the color conversion is performed, to correspond to at least one of a front face and a back face of a 3D object representing a shape of the print medium, and causing the texture parameter to correspond to the front face and the back face of the 3D object, and thus generates a rendered image representing the print medium with the image printed thereon.

DESCRIPTION OF EMBODIMENTS

A. First Embodiment

Figure 1:
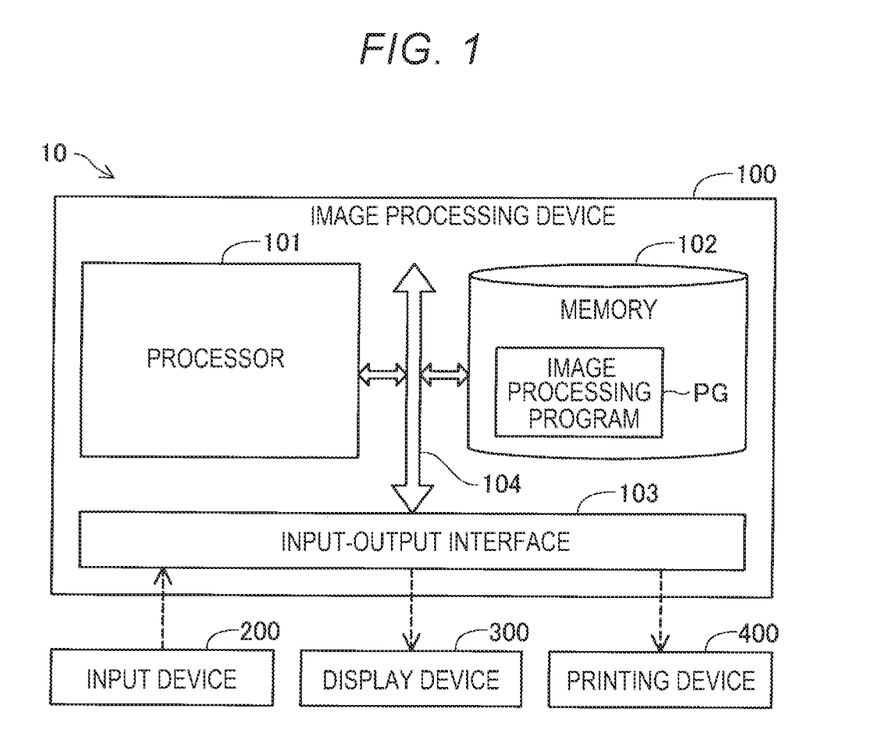
FIG. 1 is an explanatory view showing the configuration of a printing system according to a first embodiment.

FIG. 1 is an explanatory view showing the configuration of a printing system 10 having an image processing device 100 according to a first embodiment. The printing system 10 has the image processing device 100, an input device 200, a display device 300, and a printing device 400. The image processing device 100 generates a rendered image representing a print medium with an image printed thereon by physically based rendering (hereinafter simply referred to as rendering) and causes the display device 300 to display the rendered image. The print medium is, for example, a print paper such as a normal paper, a glossy paper or a matte paper. The print medium is not limited to a print paper and may be a cloth, a plastic sheet or the like. A print medium whose front face and back face have different textures from each other may be used. Also, a print medium whose front face and back face have the same texture may be used.

The image processing device 100 has a processor 101, a memory 102, an input-output interface 103, and an internal bus 104. The processor 101, the memory 102, and the input-output interface 103 are coupled in such a way as to be able to communicate with each other via the internal bus 104. The input device 200, the display device 300, and the printing device 400 are coupled to the input-output interface 103 of the image processing device 100 by wired communication or wireless communication. The input device 200 is, for example, a keyboard or a mouse. The display device 300 is, for example, a liquid crystal display. The input device 200 and the display device 300 may be integrated together in the form of a touch panel. The printing device 400 is, for example, an inkjet printer and prints an image on a print medium.

Figure 2:
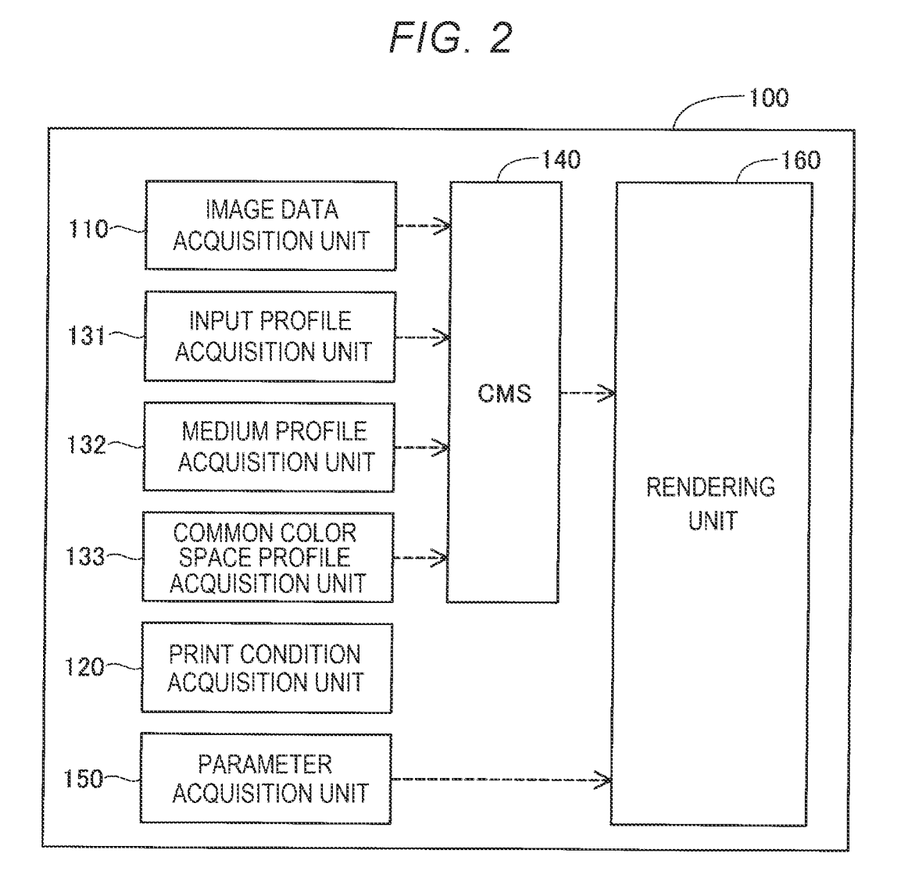
FIG. 2 is an explanatory view showing the configuration of an image processing device.

FIG. 2 is an explanatory view showing the configuration of the image processing device 100. The image processing device 100 has an image data acquisition unit 110, a print condition acquisition unit 120, an input profile acquisition unit 131, a medium profile acquisition unit 132, a common color space profile acquisition unit 133, a color management system 140, a parameter acquisition unit 150, and a rendering unit 160. The image data acquisition unit 110, the print condition acquisition unit 120, the profile acquisition units 131 to 133, the color management system 140, the parameter acquisition unit 150, and the rendering unit 160 are implemented in the form of software by the processor 101 executing an image processing program PG stored in the memory 102 in advance. The color management system 140 may also be referred to as a color conversion unit 140.

The image data acquisition unit 110 acquires image data. In this embodiment, the image data include front-face image data and back-face image data. The front-face image data is image data representing an image to be printed on the front face of the print medium. The back-face image data is image data representing an image to be printed on the back face of the print medium or an image of a logo or the like formed in advance on the back face of the print medium. In the description below, an image to be printed on the print medium is referred to as a print image, and an image formed in advance on the print medium is referred to as an existing image. When no particular distinction is made between the print image and the existing image, the image under consideration is simply referred to as an image. The image data acquired by the image data acquisition unit 110 is transmitted to the color management system 140.

The print condition acquisition unit 120 acquires a print condition including the type of the print medium. The print condition includes, for example, the resolution of printing and a condition such as which of single-sided printing and double-side printing is used, in addition to the type of the print medium. The print condition acquired by the print condition acquisition unit 120 is transmitted to the profile acquisition units 131 to 133, the color management system 140, and the parameter acquisition unit 150.

The input profile acquisition unit 131 acquires an input profile, which is an ICC profile used for color conversion from a device-dependent color space to a device-independent color space. The device-dependent color space is, for example, an RGB color space. The device-independent color space is, for example, an L*a*b (hereinafter simply referred to as Lab) color space, an XYZ color space or the like. The medium profile acquisition unit 132 acquires a medium profile, which is an ICC profile used for color conversion from the device-independent color space to a color space dependent on a device for printing. The color space dependent on the device for printing is, for example, a CMYK color space. The common color space profile acquisition unit 133 acquires a common color space profile, which is an ICC profile used for color conversion from the device-independent color space to a color space for rendering. The color space for rendering is, for example, sRGB, AdobeRGB, Display-P3 or the like. The profile acquisition units 131 to 133 acquire the profiles stored in the memory 102 in advance. The profiles acquired by the profile acquisition units 131 to 133 are transmitted to the color management system 140. The profile acquisition units 131 to 133 may acquire the profiles, for example, from an external server via a network.

The color management system 140 performs, on the image data of the print image, color conversion corresponding to the print condition in order of the color conversion to the device-independent color space using the input profile, the color conversion to the color space dependent on the device for printing using the medium profile, the color conversion to the device-independent color space using the medium profile, and the color conversion to the color space for rendering using the common color space profile. As the color conversion using the common color space profile is performed after the color conversion using the medium profile, the color value of the image data that is color-converted to the color space for rendering falls within a range that can be expressed by printing. In this embodiment, the color management system 140 performs color conversion on the image data of the existing image in order of the color conversion to the device-independent color space using the input profile and the color conversion to the color space for rendering using the common color space profile. That is, the color management system 140 does not perform the color conversion using the medium profile, on the image data representing the existing image. When the color space of the image data of the existing image is the same as the color space for rendering from the beginning, the color conversion by the color management system 140 may not be performed on the image data of the existing image. In the description below, the image data on which the color conversion to the color space for rendering is performed after the color conversion using the medium profile is referred to as managed image data. The image data on which the color conversion to the color space for rendering is performed without the color conversion using the medium profile, and the image data on which the color conversion by the color management system 140 is not performed and whose color space is the same as the color space for rendering, are referred to as original image data. When no particular distinction is made between the managed image data and the original image data, the image data under consideration is simply referred to as image data. The managed image data and the original image data are transmitted to the rendering unit 160.

The parameter acquisition unit 150 acquires various parameters used for rendering. The various parameters used for rendering include, for example, 3D object information, camera information, illumination information, a texture parameter or the like. The 3D object information is a parameter about a 3D object arranged in a virtual space. The 3D object is created in advance, modeled after the shape of the print medium. The 3D object is formed by a plurality of polygons. In this embodiment, the 3D object is formed in the shape of a thin plate. A front face of each polygon forms a front face of the 3D object. A back face of each polygon forms a back face of the 3D object. The front face of the polygon is a face from which a normal vector of the polygon is directed. The front face of the 3D object is a face corresponding to the front face of the print medium. The back face of the 3D object is a face corresponding to the back face of the print medium. The camera information is a parameter about the position and direction of a camera disposed in the virtual space. The illumination information is a parameter about the type, position, direction, color, and luminous intensity (amount of light) of a light source disposed in the virtual space. The type of the light source includes, for example, fluorescent lamp, incandescent light bulb or the like.

The texture parameter is a parameter indicating the texture of the print medium. In this embodiment, the texture parameter includes a front-face texture parameter and a back-face texture parameter. The front-face texture parameter is a texture parameter indicating the texture of the front face of the print medium. The back-face texture parameter is a texture parameter indicating the texture of the back face of the print medium. When a print medium whose front face and back face have different textures from each other is used, the content of the front-face texture parameter and the content of the back-face texture parameter are at least partly different from each other. When a print medium whose front face and back face have the same texture is used, the content of the front-face texture parameter and the content of the back-face texture parameter may be preferably the same. In this case, the front-face texture parameter and the back-face texture parameter may be put together instead of being separate from each other. Each texture parameter includes, for example, a base color about the ground color of the print medium, a smoothness indicating the smoothness of the print medium, a metallicity indicating the glossiness of the print medium, a normal map, a height map or the like. Each texture parameter may include a roughness indicating the roughness of the print medium instead of the smoothness. The normal map and the height map are used to express a microfacet of the print medium that influences the reflection of light. The normal map is a texture representing the distribution of normal vectors on the microfacet. The height map is a texture representing the distribution of heights on the microfacet. When the size of the polygons forming the 3D object is reduced in order to express the microfacet, the number of polygons vastly increases and the computational load of rendering increases. The use of the normal map and the height map enables the expression of the influence of the microfacet on the reflection of light without reducing the size of the polygons.

The parameter acquisition unit 150 acquires various parameters stored in the memory 102 in advance. The various parameters acquired by the parameter acquisition unit 150 are transmitted to the rendering unit 160. The parameter acquisition unit 150 may also acquire various parameters, for example, from an external server via a network.

The rendering unit 160 executes rendering using the image data and the various parameters and thus generated a rendered image representing the print medium with an image printed thereon. In this embodiment, the rendering unit 160 executes rendering, causing the managed image data to correspond to at least one of the front face and the back face of the 3D object, and causing the texture parameter to correspond to the front face and the back face of the 3D object. Specifically, in single-sided printing, the rendering unit 160 executes rendering, causing the managed image data of the print image to be printed on the front face of the print medium and the front-face texture parameter indicating the texture of the front face of the print medium, to correspond to the front face of the 3D object, and causing the original image data of the existing image formed in advance on the back face of the print medium and the back-face texture parameter indicating the texture of the back face of the print medium, to correspond to the back face of the 3D object. In double-sided printing, the rendering unit 160 executes rendering, causing the managed image data of the print image to be printed on the front face of the print medium and the front-face texture parameter indicating the texture of the front face of the print medium, to correspond to the front face of the 3D object, and causing the managed image data of the print image to be printed on the back face of the print medium and the back-face texture parameter indicating the texture of the back face of the print medium, to correspond to the back face of the 3D object.

Figure 3:
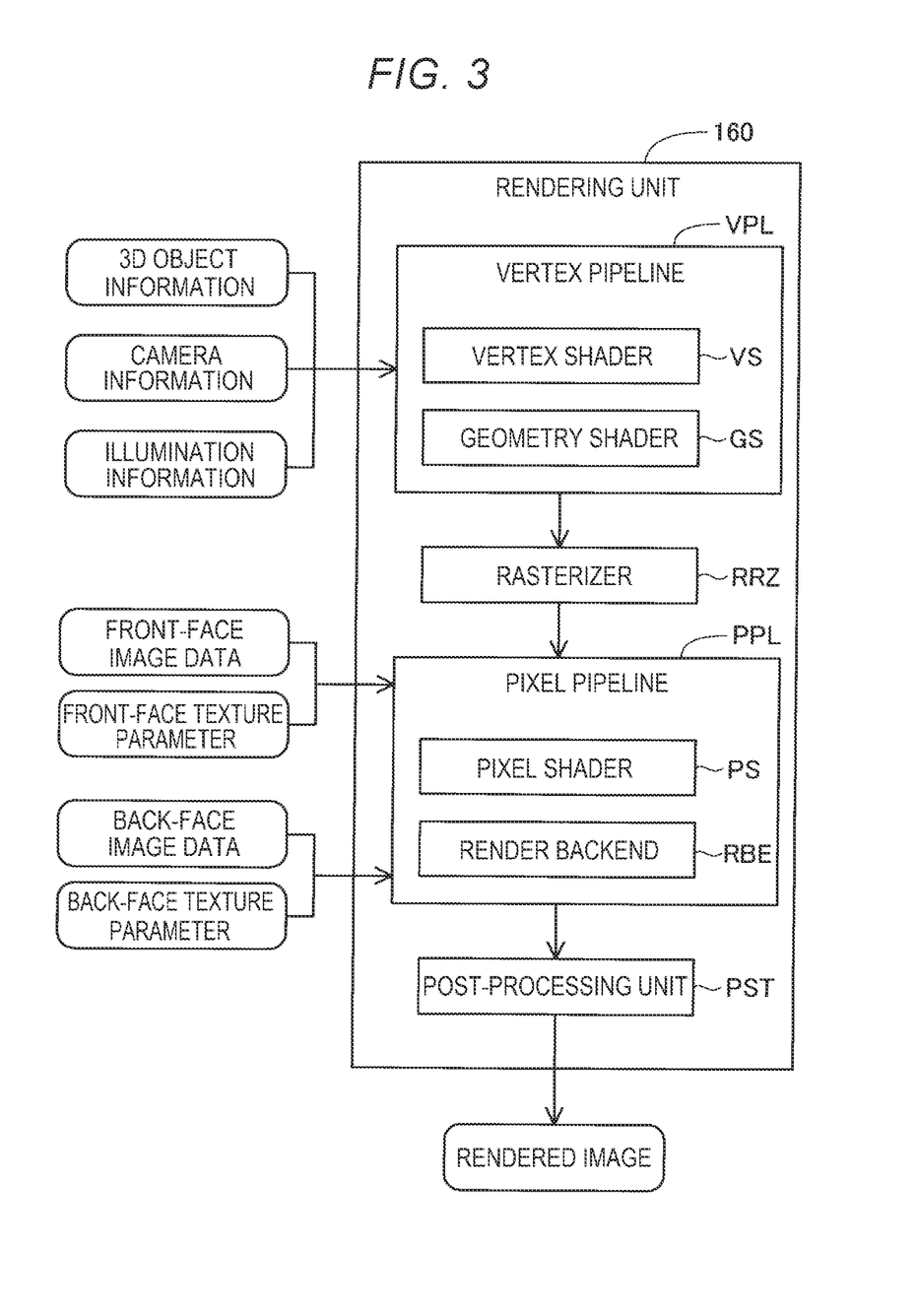
FIG. 3 is an explanatory view showing the configuration of a rendering unit.

FIG. 3 is an explanatory view showing the configuration of the rendering unit 160. The rendering unit 160 has a vertex pipeline VPL, a rasterizer RRZ a pixel pipeline PPL, and a post-processing unit PST. In this embodiment, the vertex pipeline VPL has a vertex shader VS and a geometry shader GS. The pixel pipeline PPL has a pixel shader PS and a render backend RBE.

The vertex shader VS executes coordinate transformation of a vertex of each polygon forming the 3D object, calculation of a normal vector of each polygon, shading processing, calculation of texture mapping coordinates (UV coordinates) or the like, using the 3D object information, the camera information, and the illumination information. The coordinate transformation includes model transformation, that is, coordinate transformation from a local coordinate system (also referred to as a model coordinate system), which is the coordinate system of the 3D object, to a world coordinate system (also referred to as a global coordinate system), which is the coordinate system of the virtual space, view transformation, that is, coordinate transformation from the world coordinate system to a view coordinate system (also referred to as a camera coordinate system), which is the coordinate system of the camera disposed in the virtual space, and projection transformation, that is, coordinate transformation from the view coordinate system to a screen coordinate system (also referred to as a clipping coordinate system), which is the coordinate system of a screen where a scene viewed from the camera is projected. A part of the foregoing coordinate transformations may be executed by the geometry shader GS. The result of the processing by the vertex shader VS is transmitted to the geometry shader GS.

The geometry shader GS processes an aggregate of vertices of the 3D object. The geometry shader GS increases or decreases the number of vertices and thus can transform a polygon to a dot or a line or can transform a dot or a line to a polygon. The result of the processing by the geometry shader GS is transmitted to the rasterizer RRZ. In another embodiment, the geometry shader GS may be not provided in the rendering unit 160. In this case, the result of the processing by the vertex shader VS is transmitted to the rasterizer RRZ.

The rasterizer RRZ executes rasterization processing and thus generates drawing information for each pixel, based on the result of the processing by the vertex pipeline VPL. The result of the processing by the rasterizer RRZ is transmitted to the pixel shader PS.

The pixel shader PS executes lighting processing using the rasterized 3D object, the image data, and the texture parameter, and thus calculates the color of each pixel. In this embodiment, the front face of the 3D object is formed by the front face of each polygon, and the back face of the 3D object is formed by the back face of each polygon. Therefore, the pixel shader PS execute the lighting processing, causing the front-face image data and the front-face texture parameter to correspond to the front face of each polygon, and causing the back-face image data and the back-face texture parameter to correspond to the back face of each polygon. As a function for calculating the reflection of light in the lighting processing, for example, the Disney Principled BRDF can be used. In this embodiment, the rendering unit 160 has a back-face culling function that excludes a polygon whose back face faces the camera, from drawing targets. When the rendering unit 160 has the back-face culling function, the rendering unit 160 executes the processing in the state where the back-face culling function is off. Therefore, the back face of each polygon within the field of view of the camera is not excluded. The result of the processing by the pixel shader PS is transmitted to the render backend RBE.

The render backend RBE determines whether to write pixel data generated by the pixel shader PS into a display area of the memory 102 or not. When the render backend RBE determines that the pixel data is to be written into the memory 102, the pixel data is saved as a drawing target. When the render backend RBE does not determine that the pixel data is to be written into the memory 102, the pixel data is not saved as a drawing target. To determine whether to write the pixel data or not, for example, an alpha test, a depth test, a stencil test or the like is used. As the pixel data is written into the memory 102, the pipeline processing ends.

The post-processing unit PST executes post-processing such as anti-aliasing, ambient occlusion, screen space reflection, or processing of the depth of field, on a rendered image formed of the pixel data saved in the memory 102, and thus improves the appearance of the rendered image.

Figure 4:
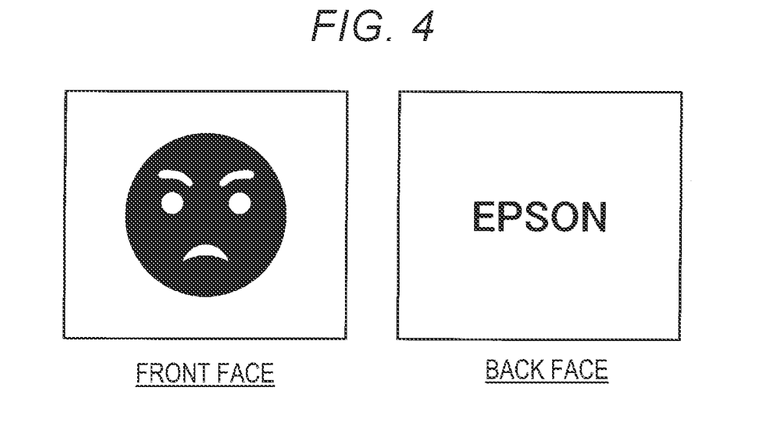
FIG. 4 is an explanatory view showing an example of a print medium with an image printed thereon.

FIG. 4 is an explanatory view showing an example of the print medium with an image printed thereon. In this example, the print medium is a print paper. A print image is printed on the front face of the print medium by the printing device 400. An existing image of a logo is formed at the back face of the print medium. After the existing image is formed at the back face of the print medium, the entire back face is coated.

Figure 5:
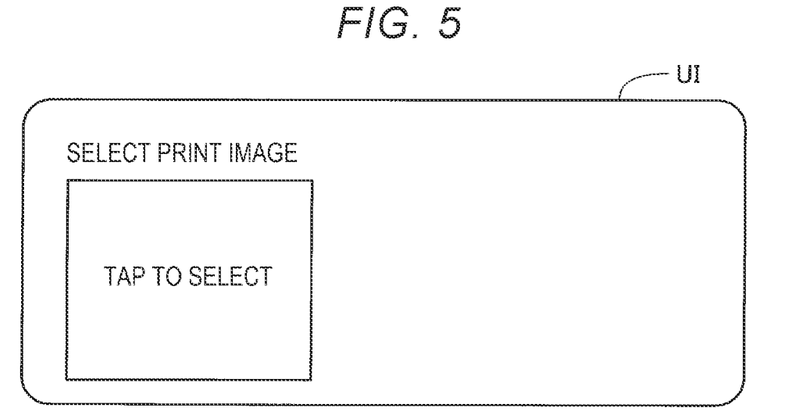
FIG. 5 is an explanatory view showing a first example of a user interface for image data input.

FIG. 5 is an explanatory view showing a first example of a user interface UI for image data input. The user interface UI shown in FIG. 5 is displayed, for example, on the display device 300. The user interface UI shown in FIG. 5 is for single-sided printing. On the user interface UI shown in FIG. 5, one input area to input image data is provided. The image data acquisition unit 110 acquires image data of a print image inputted to the user interface UI, as front-face image data, and acquires image data of an existing image corresponding to the type of the print medium, as back-face image data.

Figure 6:
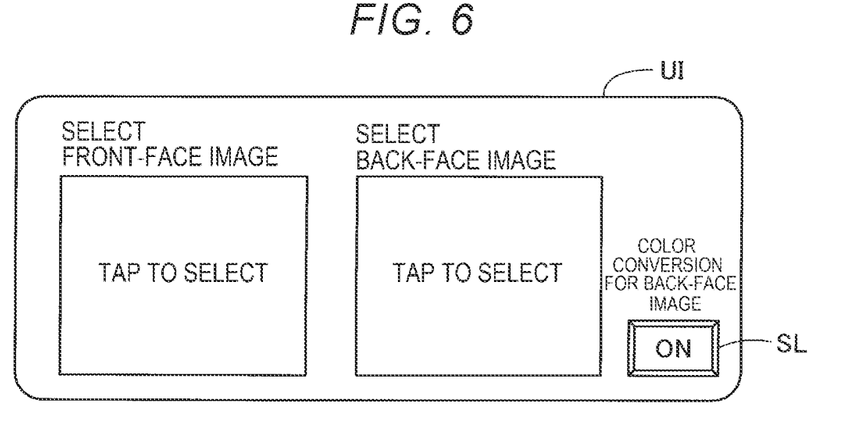
FIG. 6 is an explanatory view showing a second example of the user interface for image data input.

FIG. 6 is an explanatory view showing a second example of the user interface UI for image data input. The user interface UI shown in FIG. 6 is displayed, for example, on the display device 300. The user interface UI shown in FIG. 6 can be used for both single-sided printing and double-sided printing. On the user interface UI shown in FIG. 6, two areas to input image data are provided. The image data acquisition unit 110 acquires image data of an image inputted in a left-side area of the two areas, as front-face image data, and acquires image data of an image inputted in a right-side area, as back-face image data. Therefore, in single-sided printing, the image data of the print image to be printed on the front face of the print medium can be inputted via the left-side area and the image data of the existing image formed at the back face of the print medium can be inputted via the right-side area. In double-sided printing, the image data of the print image to be printed on the front face of the print medium can be inputted via the left-side area and the image data of the print image to be printed on the back face of the print medium can be inputted via the right-side area.

On the user interface UI shown in FIG. 6, a selection unit SL to select whether or not to perform color conversion using the medium profile, on the back-face image data, is provided. The color management system 140 may be configured to perform color conversion using the input profile, the medium profile, and the common color space profile, on the back-face image data, regardless of whether the image represented by the back-face image data is a print image or an existing image, when performing color conversion on the back-face image data is selected via the selection unit SL, and configured to perform color conversion using the input profile and the common color space profile, on the back-face image data, regardless of whether the image represented by the back-face image data is a print image or an existing image, when not performing color conversion using the medium profile on the back-face image data is selected via the selection unit SL.

Figure 7:
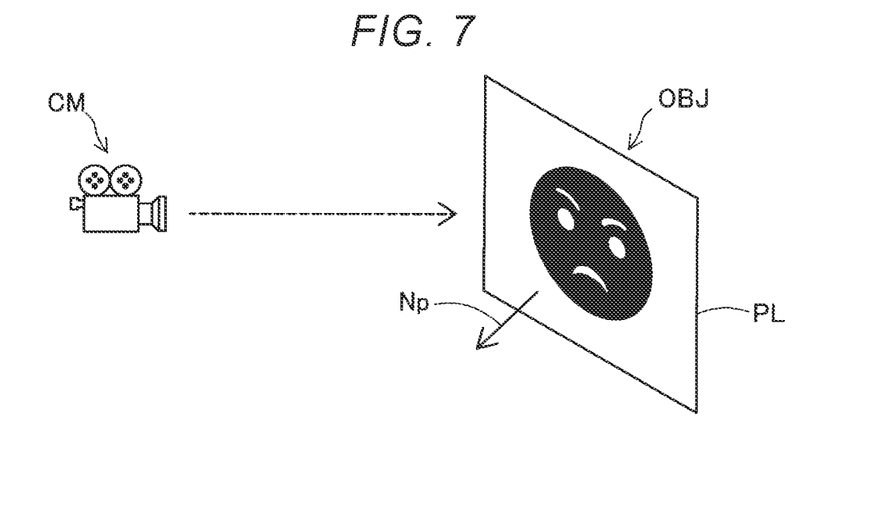
FIG. 7 is an explanatory view schematically showing how a front face of a 3D object is observed.
Figure 8:
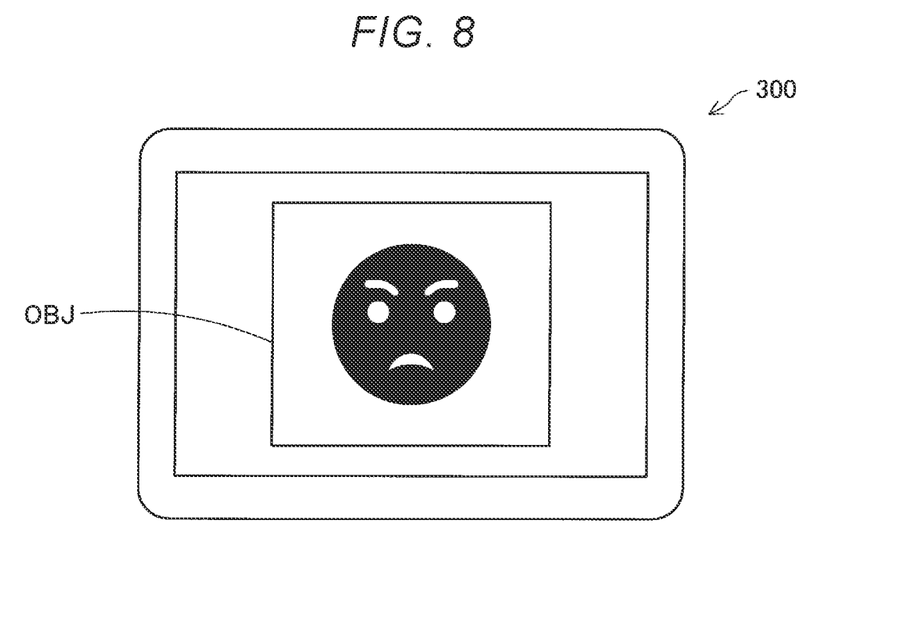
FIG. 8 is an explanatory view schematically showing a rendered image displayed at the time of front face observation.
Figure 9:
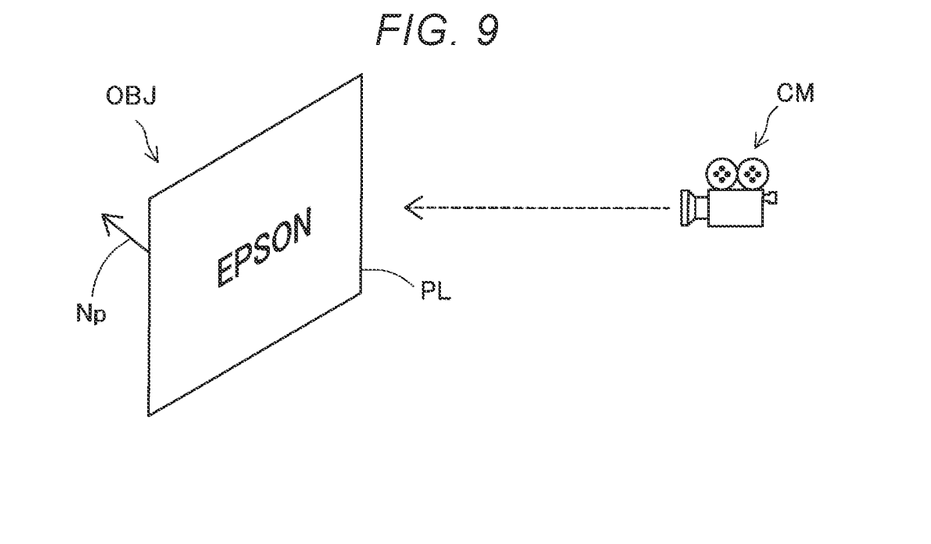
FIG. 9 is an explanatory view schematically showing how a back face of the 3D object is observed.
Figure 10:
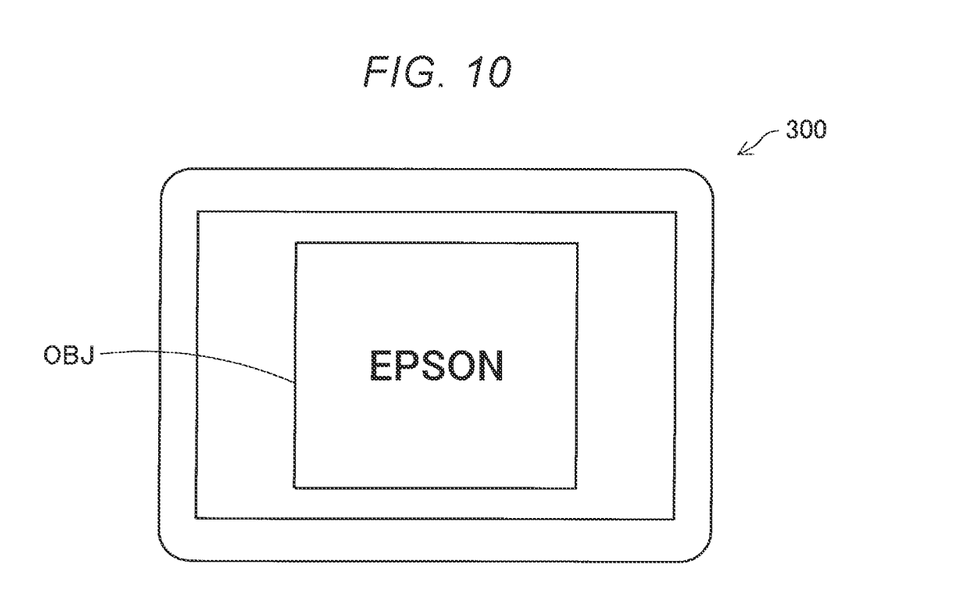
FIG. 10 is an explanatory view schematically showing a rendered image displayed at the time of back face observation.

FIG. 7 is an explanatory view schematically showing how the front face of a 3D object OBJ is observed. FIG. 8 is an explanatory view schematically showing a rendered image displayed on the display device 300 when the front face of the 3D object OBJ is observed. FIG. 9 is an explanatory view schematically showing how the back face of the 3D object OBJ is observed. FIG. 10 is an explanatory view schematically showing a rendered image displayed on the display device 300 when the back face of the 3D object OBJ is observed.

In FIGS. 7 and 8, for the sake of convenience, the 3D object OBJ formed by one polygon PL is illustrated. In this embodiment, the polygon PL forms the front face of the 3D object OBJ and also forms the back face of the 3D object OBJ. The front face of the polygon PL, from which a normal vector Np of the polygon PL is directed, forms the front face of the 3D object OBJ, and the back face of the polygon PL forms the back face of the 3D object OBJ. In FIGS. 7 and 8, the line of sight of a camera CM is indicated by a dashed line with an arrow. Although not illustrated in FIGS. 7 and 8, the 3D object OBJ is illuminated by light from a light source.

When the camera CM is directed to the front face of the 3D object OBJ, as shown in FIG. 7, the rendering unit 160 generates a rendered image in the case where the front face of the 3D object OBJ is observed via the camera CM, and causes the display device 300 to display the rendered image, as shown in FIG. 8. Since the front-face image data and the front-face texture parameter correspond to the front face of the 3D object OBJ, the rendered image in FIG. 8 shows the print medium with the print image attached to the front face thereof, with the texture of the front face of the print medium.

When the camera CM is directed to the back face of the 3D object OBJ, as shown in FIG. 9, the rendering unit 160 generates a rendered image in the case where the back face of the 3D object OBJ is observed via the camera CM, and causes the display device 300 to display the rendered image, as shown in FIG. 10. Since the back-face image data and the back-face texture parameter correspond to the back face of the 3D object OBJ, the rendered image in FIG. 10 shows the print medium with the print image or the existing image attached to the back face thereof, with the texture of the back face of the print medium.

The image processing device 100 according to this embodiment described above can generate a rendered image representing a print medium with an image printed thereon by the printing device 400 and can cause the display device 300 to display the rendered image, before the printing by the printing device 400. Therefore, a print preview can be shown, using a rendered image that is realistically expressed with the texture of the print medium.

In this embodiment, in single-sided printing, the rendering unit 160 executes rendering, causing the managed image data of the print image to be printed on the front face of the print medium and the front-face texture parameter indicating the texture of the front face of the print medium, to correspond to the front face of the 3D object OBJ, and causing the original image data of the existing image formed in advance on the back face of the print medium and the back-face texture parameter indicating the texture of the back face of the print medium, to correspond to the back face of the 3D object OBJ. Therefore, a rendered image representing the print medium with the print image printed on the front face thereof by single-sided printing and with the existing image formed at the back face thereof, while expressing the texture of each of the front face and the back face of the print medium, can be generated.

In this embodiment, in double-sided printing, the rendering unit 160 executes rendering, causing the managed image data of the print image to be printed on the front face of the print medium and the front-face texture parameter indicating the texture of the front face of the print medium, to correspond to the front face of the 3D object OBJ, and causing the managed image data of the print image to be printed on the back face of the print medium and the back-face texture parameter indicating the texture of the back face of the print medium, to correspond to the back face of the 3D object OBJ. Therefore, a rendered image representing the print medium with the corresponding print images printed on the front face and the back face thereof by double-sided printing, while expressing the texture of each of the front face and the back face of the print medium, can be generated.

In this embodiment, the front face of the polygon PL forms the front face of the 3D object OBJ and the back face of the polygon PL forms the back face of the 3D object OBJ. Thus, a thin print medium can be expressed with a realistic texture.

B. Second Embodiment

Figure 11:
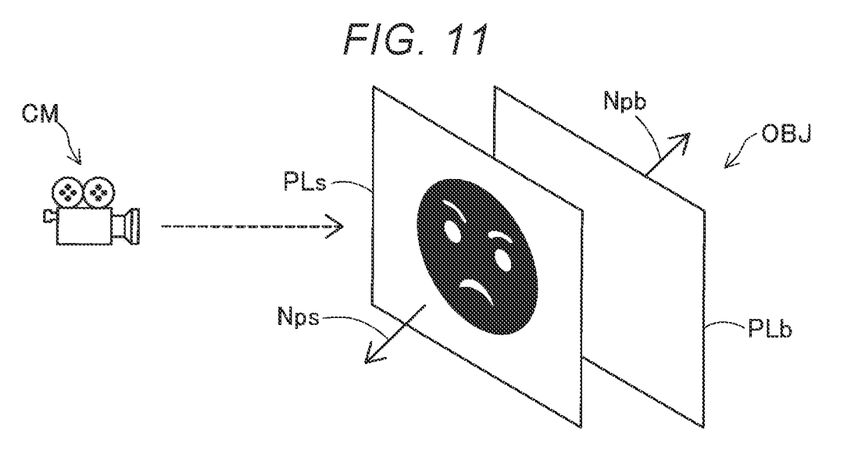
FIG. 11 is an explanatory view schematically showing how a front face of a 3D object is observed in an image processing device according to a second embodiment.
Figure 12:
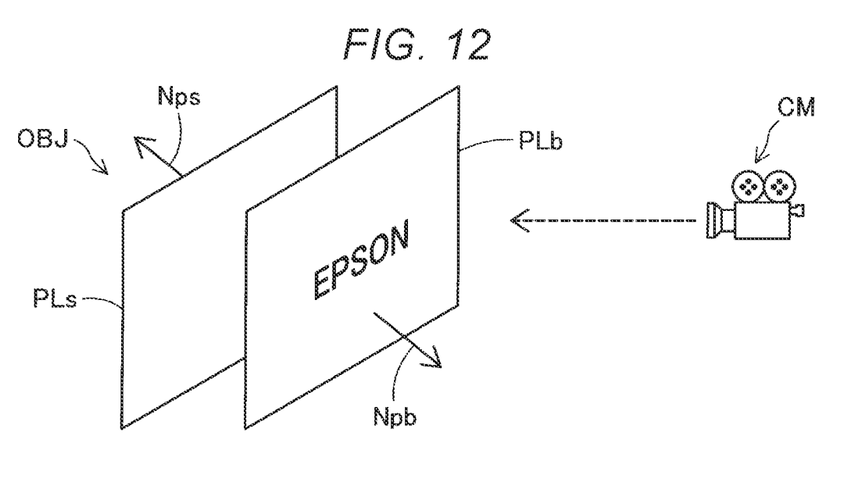
FIG. 12 is an explanatory view schematically showing how a back face of the 3D object is observed in the image processing device according to the second embodiment.

FIG. 11 is an explanatory view schematically showing how the front face of the 3D object OBJ is observed in the image processing device 100 according to a second embodiment. FIG. 12 is an explanatory view schematically showing how the back face of the 3D object OBJ is observed in the image processing device 100 according to the second embodiment. The second embodiment differs from the first embodiment in that the 3D object OBJ having a front-face polygon PLs and a back-face polygon PLb is used for rendering. The other configurations are the same as in the first embodiment unless stated otherwise.

As shown in FIGS. 11 and 12, in this embodiment, the 3D object OBJ has the front-face polygon PLs forming the front face of the 3D object OBJ, and the back-face polygon PLb disposed back to back with the front-face polygon PLs and forming the back face of the 3D object OBJ. The front face of the front-face polygon PLs, which is a face from which a normal vector Nps of the front-face polygon PLs is directed, faces outside of the 3D object OBJ. The back face of the front-face polygon PLs faces inside of the 3D object OBJ. The front face of the back-face polygon PLb, which is a face from which a normal vector Npb of the back-face polygon PLb is directed, faces outside of the 3D object OBJ.

The back face of the back-face polygon PLb faces inside of the 3D object OBJ. In FIGS. 11 and 12, for the sake of convenience, the space between the front-face polygon PLs and the back-face polygon PLb is illustrated as a large space. However, in practice, the space between the front-face polygon PLs and the back-face polygon PLb is approximately the same as the thickness of the print medium. In FIGS. 11 and 12, the 3D object OBJ is illustrated as being formed by two plates disposed back to back with each other. However, the 3D object OBJ may have a lateral part coupling the two plates. The rendering unit 160 executes rendering, causing the front-face image data and the front-face texture parameter to correspond to the front face of the front-face polygon PLs, and causing the back-face image data and the back-face texture parameter to correspond to the front face of the back-face polygon PLb. In this embodiment, the back-face culling function is turned on. Thus, the front face of the front-face polygon PLs and the front face of the back-face polygon PLb are defined as drawing targets, whereas the back face of the front-face polygon PLs and the back face of the back-face polygon PLb are excluded from drawing targets. Therefore, the computational load of rendering can be reduced.

When the camera CM is directed to the front face of the 3D object OBJ, as shown in FIG. 11, the rendering unit 160 generates a rendered image in the case where the front face of the 3D object OBJ is observed via the camera CM, and causes the display device 300 to display the rendered image, as shown in FIG. 8. Since the front-face image data and the front-face texture parameter correspond to the front face of the 3D object OBJ, the rendered image shows the print medium with the print image attached to the front face thereof, with the texture of the front face of the print medium. When the camera CM is directed to the back face of the 3D object OBJ, as shown in FIG. 12, the rendering unit 160 generates a rendered image in the case where the back face of the 3D object OBJ is observed via the camera CM, and causes the display device 300 to display the rendered image, as shown in FIG. 10. Since the back-face image data and the back-face texture parameter correspond to the back face of the 3D object OBJ, the rendered image shows the print medium with the print image or the existing image attached to the back face thereof, with the texture of the back face of the print medium.

The image processing device 100 according to this embodiment described above can achieve effects similar to those in the first embodiment. Particularly in this embodiment, the front-face polygon PLs forms the front face of the 3D object OBJ, and the back-face polygon PLb disposed back to back with the front-face polygon PLs forms the back face of the 3D object OBJ. Therefore, the thickness of the print medium can be expressed as well. Thus, a thick print medium can be expressed with a realistic texture.

C. Other Embodiments (C1) In the image processing device 100 according to the foregoing embodiments, the texture parameter includes the front-face texture parameter and the back-face texture parameter, and the rendering unit 160 executes rendering, causing the front-face texture parameter to correspond to the front face of the 3D object, and causing the back-face texture parameter to correspond to the back face of the 3D object. However, the texture parameter may be not separated for the front face and the back face. In this case, the rendering unit

160 may execute rendering, causing the same texture parameter to correspond to the front face and the back face of the 3D object.

(C2) The image processing device 100 according to the foregoing embodiments generates a rendered image representing a print medium with an image directly printed thereon by a printing device such as an inkjet printer. However, the image processing device 100 may generate a rendered image representing a medium to which an image is transferred by thermal transfer from a transfer paper with the image printed thereon by a printing device. In this case, the medium to which the image is transferred by thermal transfer from the transfer paper is referred to as a print medium.

D. Other Aspects

The present disclosure is not limited to the foregoing embodiments and can be implemented according to various aspects without departing from the spirit and scope of the present disclosure. For example, the present disclosure can be implemented according to the aspects described below. A technical feature in the embodiments corresponding to a technical feature in the aspects described below can be replaced or combined where appropriate in order to solve a part or all of the problems of the present disclosure or in order to achieve a part or all of the effects of the present disclosure. The technical feature can be deleted where appropriate, unless described as essential in the present specification.

(1) According to a first aspect of the present disclosure, an image processing device is provided. The image processing device includes: an image data acquisition unit that acquires image data; a print condition acquisition unit that acquires a print condition including a type of a print medium on which an image is printed; a parameter acquisition unit that acquires a texture parameter indicating a texture of the print medium; a color conversion unit that performs color conversion corresponding to the print condition, on the image data; and a rendering unit that executes rendering, causing the image data on which the color conversion is performed, to correspond to at least one of a front face and a back face of a 3D object representing a shape of the print medium, and causing the texture parameter to correspond to the front face and the back face of the 3D object, and thus generates a rendered image representing the print medium with the image printed thereon.

The image processing device according to this aspect enables the texture of a print medium to be expressed on the front face and the back face of a 3D object. Therefore, the print medium with an image printed thereon can be represented by a rendered image that is realistically expressed with the texture of the print medium.

(2) In the image processing device according to the foregoing aspect, the image data acquisition unit may acquire front-face image data of an image to be printed on a front face of the print medium, and back-face image data of an image shown in advance on a back face of the print medium. The rendering unit may cause the front-face image data on which the color conversion is performed, to correspond to the front face of the 3D object, and cause the back-face image data to correspond to the back face of the 3D object.

The image processing device according to this aspect enables a rendered image to express a print medium with an image shown in advance on the back face and with an image printed on the front face.

(3) In the image processing device according to the foregoing aspect, the image data acquisition unit may acquire front-face image data of an image to be printed on a front face of the print medium, and back-face image data of an image to be printed on a back face of the print medium. The rendering unit may cause the front-face image data on which the color conversion is performed, to correspond to the front face of the 3D object, and cause the back-face image data on which the color conversion is performed, to correspond to the back face of the 3D object.

The image processing device according to this aspect enables a rendered image to express a print medium with an image printed on the front face and the back face.

(4) In the image processing device according to the foregoing aspect, the parameter acquisition unit may acquire a front-face texture parameter indicating a texture of a front face of the print medium, and a back-face texture parameter indicating a texture of a back face of the print medium. The rendering unit may cause the front-face texture parameter to correspond to the front face of the 3D object, and cause the back-face texture parameter to correspond to the back face of the 3D object.

The image processing device according to this aspect enables a print medium whose front face and back face have different textures from each other, to be expressed with realistic textures.

(5) In the image processing device according to the foregoing aspect, the 3D object may include a polygon forming the front face and the back face of the 3D object.

The image processing device according to this aspect enables a thin print medium to be expressed with a realistic texture.

(6) In the image processing device according to the foregoing aspect, the 3D object may include a front-face polygon forming the front face of the 3D object, and a back-face polygon disposed back to back with the front-face polygon and forming the back face of the 3D object.

The image processing device according to this aspect enables a thick print medium to be expressed with a realistic texture.

(7) The image processing device according to the foregoing aspect may include a selection unit that selects whether or not to perform the color conversion on the image data corresponding to the back face of the 3D object.

The image processing device according to this aspect can switch whether or not to perform color conversion on image data.

(8) According to a second aspect of the present disclosure, a printing system is provided. The printing system includes: the image processing device according to the first aspect; a display device that displays the rendered image generated by the image processing device; and a printing device that prints an image on the print medium.

The printing system according to this aspect enables a preview of a print medium with an image printed thereon by the printing device, using a rendered image generated by the image processing device.

(9) According to a third aspect of the present disclosure, a non-transitory computer-readable storage medium storing an image processing program is provided. The image processing program causes a computer to execute: an image data acquisition function that acquires image data; a print condition acquisition function that acquires a print condition including a type of a print medium on which an image is printed; a parameter acquisition function that acquires a texture parameter indicating a texture of the print medium;

a color conversion function that performs color conversion corresponding to the print condition, on the image data; and a rendering function that executes rendering, causing the image data on which the color conversion is performed, to correspond to at least one of a front face and a back face of a 3D object representing a shape of the print medium, and causing the texture parameter to correspond to the front face and the back face of the 3D object, and thus generates a rendered image representing the print medium with the image printed thereon.

The image processing program according to this aspect enables the texture of a print medium to be expressed on the front face and the back face of a 3D object. Therefore, the print medium with an image printed thereon can be represented by a rendered image that is realistically expressed with the texture of the print medium.

The present disclosure can also be implemented according to various other aspects than the image processing device, the printing system, and the image processing program. For example, the present disclosure can be implemented according to an aspect such as an image processing method.

What is claimed is:

1. An image processing device comprising:
   an image data acquisition unit that acquires image data;
   a print condition acquisition unit that acquires a print condition including a type of a print medium on which an image is printed;
   a parameter acquisition unit that acquires a texture parameter indicating a texture of the print medium;
   a color conversion unit that performs color conversion corresponding to the print condition, on the image data; and
   a rendering unit that executes rendering, causing the image data on which the color conversion is performed, to correspond to at least one of a front face and a back face of a 3D object representing a shape of the print medium, and causing the texture parameter to correspond to the front face and the back face of the 3D object, and thus generates a rendered image representing the print medium with the image printed thereon.

2. The image processing device according to claim 1, wherein
   the image data acquisition unit acquires front-face image data of an image to be printed on a front face of the print medium, and back-face image data of an image shown in advance on a back face of the print medium, and
   the rendering unit causes the front-face image data on which the color conversion is performed, to correspond to the front face of the 3D object, and causes the back-face image data to correspond to the back face of the 3D object.

3. The image processing device according to claim 1, wherein
   the image data acquisition unit acquires front-face image data of an image to be printed on a front face of the print medium, and back-face image data of an image to be printed on a back face of the print medium, and
   the rendering unit causes the front-face image data on which the color conversion is performed, to correspond to the front face of the 3D object, and causes the back-face image data on which the color conversion is performed, to correspond to the back face of the 3D object.

4. The image processing device according to claim 1, wherein
   the parameter acquisition unit acquires a front-face texture parameter indicating a texture of a front face of the print medium, and a back-face texture parameter indicating a texture of a back face of the print medium, and
   the rendering unit causes the front-face texture parameter to correspond to the front face of the 3D object, and causes the back-face texture parameter to correspond to the back face of the 3D object.

5. The image processing device according to claim 4, wherein
   the 3D object includes a polygon forming the front face and the back face of the 3D object.

6. The image processing device according to claim 4, wherein
   the 3D object includes a front-face polygon forming the front face of the 3D object, and a back-face polygon disposed back to back with the front-face polygon and forming the back face of the 3D object.

7. The image processing device according to claim 1, further comprising:
   a selection unit that selects whether or not to perform the color conversion on the image data corresponding to the back face of the 3D object.

8. A printing system comprising:
   the image processing device according to claim 1;
   a display device that displays the rendered image generated by the image processing device; and
   a printing device that prints an image on the print medium.

9. A non-transitory computer-readable storage medium storing an image processing program, the image processing program causing a computer to execute:
   an image data acquisition function that acquires image data;
   a print condition acquisition function that acquires a print condition including a type of a print medium on which an image is printed;
   a parameter acquisition function that acquires a texture parameter indicating a texture of the print medium;
   a color conversion function that performs color conversion corresponding to the print condition, on the image data; and
   a rendering function that executes rendering, causing the image data on which the color conversion is performed, to correspond to at least one of a front face and a back face of a 3D object representing a shape of the print medium, and causing the texture parameter to correspond to the front face and the back face of the 3D object, and thus generates a rendered image representing the print medium with the image printed thereon.

* * * * *